United States Patent
Suwada

(10) Patent No.: US 8,331,428 B2
(45) Date of Patent: Dec. 11, 2012

(54) SIGNAL TRANSMISSION APPARATUS AND SIGNAL TRANSMISSION CONTROL METHOD

(75) Inventor: Makoto Suwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 12/502,272

(22) Filed: Jul. 14, 2009

(65) Prior Publication Data

US 2010/0020859 A1 Jan. 28, 2010

(30) Foreign Application Priority Data

Jul. 28, 2008 (JP) ................................ 2008-193700

(51) Int. Cl.
*H04B 3/04* (2006.01)

(52) U.S. Cl. ....................................................... 375/220

(58) Field of Classification Search .................. 375/219, 375/220, 222, 257, 296, 297; 455/46, 501, 455/88, 553.1
See application file for complete search history.

(56) References Cited

U.S. PATENT DOCUMENTS

| | | | | |
|---|---|---|---|---|
| 4,555,806 A | * | 11/1985 | Lange et al. | ................... 714/708 |
| 5,754,103 A | * | 5/1998 | Kanai et al. | ................... 340/507 |
| 7,447,260 B2 | | 11/2008 | Takahashi | |
| 2005/0233701 A1 | * | 10/2005 | Martinez | ................... 455/67.11 |
| 2006/0204245 A1 | | 9/2006 | Tanabe | |
| 2009/0245476 A1 | * | 10/2009 | Lindqvist | ................... 379/32.04 |

FOREIGN PATENT DOCUMENTS

| | | |
|---|---|---|
| JP | 2004-015622 | 1/2004 |
| JP | 2006-246191 | 9/2006 |

* cited by examiner

*Primary Examiner* — Young T. Tse
(74) *Attorney, Agent, or Firm* — Squire Sanders (US) LLP

(57) ABSTRACT

A signal transmission apparatus comprises a first signal transmission section configured to transmit a first signal for performing measurement of characteristics of a transmission line to the transmission line. A reflection characteristic measurement section is configured to measure a reflection characteristic of the transmission line. A pass characteristic measurement section is configured to measure a pass characteristic of the transmission line. A determination section is configured to determine a transmission clock frequency based upon the reflection characteristic. A second signal transmission section is configured to modulate information and to transmit a second signal obtained by the modulation to the transmission line. A second signal receiving section is configured to receive and to demodulate the second signal which has been transmitted by the second signal transmission section and has passed the transmission line.

21 Claims, 7 Drawing Sheets

FIG. 5

| JUDGMENT PATTERN NUMBER | RANGE OF FREQUENCY | INSERTION LOSS CONDITION | REFLECTION LOSS CONDITION |
|---|---|---|---|
| 1 | 1GHz~5GHz | IL≧-22.5 | RL≦-7.5 |

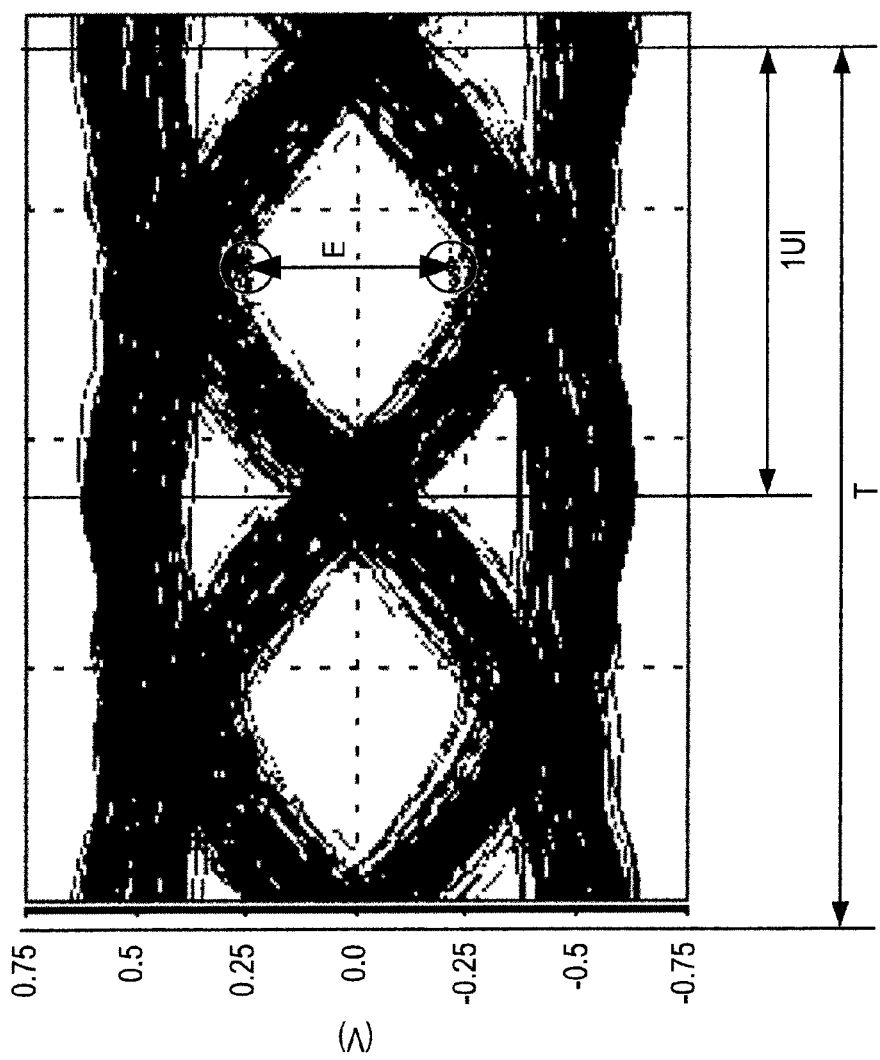

SIGNAL TRANSMISSION APPARATUS AND SIGNAL TRANSMISSION CONTROL METHOD

CROSS-REFERENCE TO RELATED APPLICATION

This application is based upon and claims the benefit of priority of the prior Japanese Patent Application No. 2008-193700, filed on Jul. 28, 2008, the entire contents of which are incorporated herein by reference.

BACKGROUND

1. Field

This embodiment relates to a signal transmission apparatus which performs transmission of a signal via a transmission line and a signal transmission apparatus control method.

2. Description of the Related Art

Devices using the PCI (Peripheral Component Interconnect) standard and the PCI-X standards, which have been used for personal computers and servers have been transitioning to the PCI Express standard. ATA (Advanced Technology Attachment), which has been used for connection of a storage device such as a hard disk and a CD-ROM, has been transitioning to Serial ATA. Similarly, SCSI (Small Computer System Interface) has been transitioning to Serial Attached SCSI.

Thus, the electrical interface for signal transmission rapidly transitions from a parallel interface to a serial interface.

Since the serial interface uses a wider band than the parallel interface, there is a demand for a method for appropriately determining loss, jitter, noise, variation and the like in a transmission line, and also for obtaining a more stable transmission waveform.

The serial interface has a transmission LSI (Large Scale Integration) device for sending out a signal waveform; a transmission line configured by a printed circuit board, a connector and a cable; and a receiving LSI device for receiving a signal waveform.

Designing a high-speed transmission system with a GHz-order transmission speed is required to obtain an optimum transmission quality requires consideration of the capability of a transmitter and a receiver, variation of characteristics of elements and substrate materials, characteristics of each of elements constituting a transmission line, noise and the like.

A conventional transmission system has a printed circuit board, a cable and a connector in addition to the transmission LSI device and the receiving LSI device. Examples of items to be considered in this case include: transmission and receiving performance; variation of LSI's, materials and characteristics; power source and crosstalk noise; reflection; loss of PCB (Printed Circuit Board) wire, VIA, cable, connector and transmission/receiving LSI package; and the like.

In the related art, there are an equalizer for automating setting of an equalization parameter and a pre-emphasis adjustment method for shortening the time required for pre-emphasis adjustment (see Japanese Laid-open Patent Publication No. 2004-015622 and Japanese Laid-open Patent Publication No. 2006-246191, for example).

In general high-speed transmission, receiving eye opening adjustment and EQ (equalizer) adjustment by the emphasis adjustment are performed. However, since the transmission clock frequency is specified in advance, an optimum transmission method is not necessarily realized.

Recently, a high-speed transmission system is provided with a plurality ports, and a multi-port transmission/receiving circuit is included in an LSI device. Therefore, it is feared that the transmission quality may be deteriorated by open reflection in an open lane or noise by simultaneous operation of multiple lanes. Furthermore, though it is often assumed that the receiving margin is increased by increasing the receiving eye opening, noise inside the multi-port LSI is increased by receiving a large eye opening waveform. Similarly, deterioration of the transmission quality may be also caused.

SUMMARY

According to one embodiment of the invention, a signal transmission apparatus comprises a first signal transmission section configured to transmit a first signal for performing measurement of characteristics of a transmission line to the transmission line. A reflection characteristic measurement section is configured to measure a reflection characteristic of the transmission line based upon a reflected signal transmitted by the first signal transmission section and reflected by the transmission line. A pass characteristic measurement section is configured to measure a pass characteristic of the transmission line based upon a passed signal that has been transmitted by the first signal transmission section and has passed the transmission line. A determination section is configured to determine a transmission clock frequency based upon the reflection characteristic measured by the reflection characteristic measurement section and the pass characteristic measured by the passed characteristics measurement section. A second signal transmission section is configured to modulate information using the transmission clock frequency determined by the determination section and to transmit a second signal obtained by the modulation to the transmission line. A second signal receiving section is configured to receive and to demodulate the second signal which has been transmitted by the second signal transmission section and has passed the transmission line.

In another embodiment, a signal transmission method comprises transmitting a first signal performing measurement of the characteristics of a transmission line to the transmission line. A reflection characteristic of the transmission line is measured, based upon a reflected signal reflected by the transmission line. A pass characteristic of the transmission line is measured based upon a pass signal that has passed the transmission line. A transmission clock frequency is determined, based upon the measured reflection characteristic and the measured pass characteristic. Information is modulated using the determined transmission clock frequency, and a second signal obtained by the modulation is transmitted to the transmission line. The second signal is then received and demodulated.

In another embodiment, the invention comprises a signal transmission apparatus comprising transmitting means for transmitting a first signal performing measurement of characteristics of a transmission line to the transmission line. This embodiment also includes measuring means for measuring a reflection characteristic of the transmission line based upon a reflected signal reflected by the transmission line, and for measuring a pass characteristic of the transmission line based upon a pass signal that has passed the transmission line. Determining means are provided, for determining a transmission clock frequency based upon the measured reflection characteristic and the measured pass characteristic. Modulating means are provided to modulate information using the determined clock frequency, and for transmitting a second signal obtained by the modulation to the transmission line. Demodulating means are provided for receiving and demodulating the second signal which has been transmitted and has passed the transmission line.

It is to be understood that both the foregoing general description and the following detailed description are exemplary and explanatory and are not restrictive of the invention, as claimed.

BRIEF DESCRIPTION OF THE DRAWINGS

FIG. 5 is a table showing an example of a judgment table of an embodiment of the invention;

FIG. 7 is a waveform diagram showing an example of an eye pattern of a received signal of an embodiment of the invention.

DETAILED DESCRIPTION

Embodiments of the invention will be described with reference to drawings.

A signal transmission system or apparatus according to an embodiment of the invention performs binary transmission. In the binary transmission, a transmission signal can take two kinds of levels at a data judgment timing. Furthermore, this signal transmission system determines a transmission clock frequency so that the transmission quality satisfies predetermined conditions and the transmission speed becomes the highest. In this embodiment, the transmission clock frequency determined in this way will be hereinafter referred to as an optimum frequency.

The configuration of the signal transmission system according to this embodiment will be described below.

Figure 1:
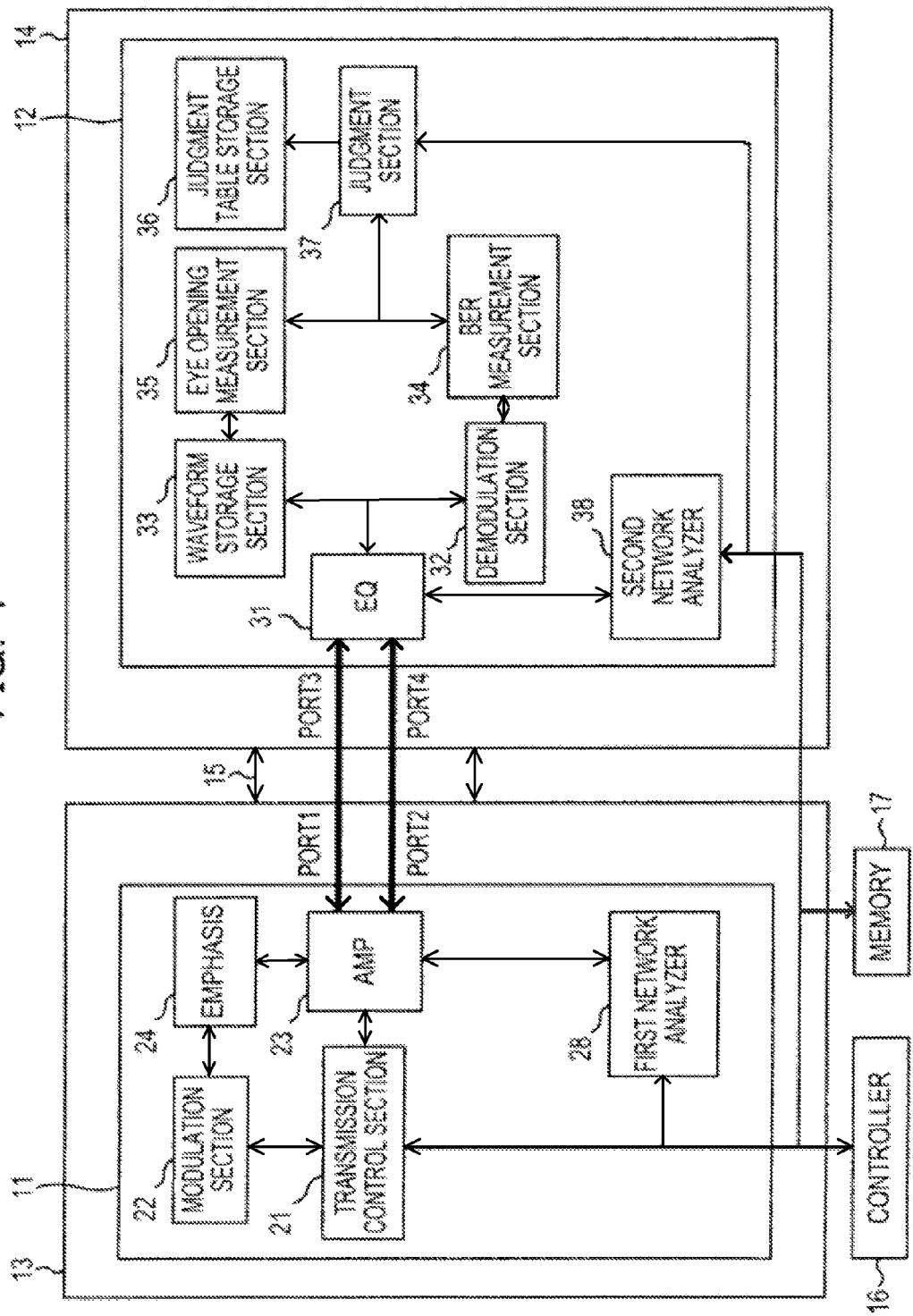
FIG. 1 is a block diagram showing an example of the configuration of a signal transmission system of are embodiment of the invention.

FIG. 1 is a block diagram showing an example of the configuration of the signal transmission system according to the invention. This signal transmission system has a transmission LSI device 11, a receiving LSI device 12, printed circuit boards 13 and 14, a connector 15, a controller 16 and a memory 17. The transmission LSI device 11 can have a transmission control section 21, a modulation section 22, an amplification section 23 (Amp), an emphasis section 24 (Emphasis) and a first network analyzer 28. The receiving LSI device 12 can have an EQ 31, a demodulation section 32, a waveform storage section 33, a BER (Bit Error Ratio) measurement section 34, an eye opening measurement section 35, a judgment table storage section 36, a judgment section 37, and a second network analyzer 38.

The transmission LSI device 11 can be disposed on the printed circuit board 13. The receiving LSI device 12 can be disposed on the printed circuit board 14.

In this example, transmission section 22 can have a port 1 and a port 2. The receiving section 32 has a port 3 and a port 4. The port 1 and the port 3 are connected via a transmission signal line on the printed circuit board 13, the connector 15 and a transmission signal line on the printed circuit board 14. A signal transmitted from the port 1 is received by the port 3. Similarly, the port 2 and the port 4 are connected via a transmission signal line on the printed circuit board 13, the connector 15 and a transmission signal line on the printed circuit board 14. A signal transmitted from the port 2 is received by the port 4.

In this embodiment, the signal route constituted by the transmission signal line on the printed circuit board 13, the connector 15 and the transmission signal line on the printed circuit board 14 will be hereinafter referred to as a transmission line or a lane.

Each of the sections in the transmission LSI device 11 and the receiving LSI device 12 is provided for each lane.

The controller 16, the memory 17, the transmission control section 21, the transmission section 22, the EQ 31 and the receiving section 32 are connected via a control signal line.

Figure 2:
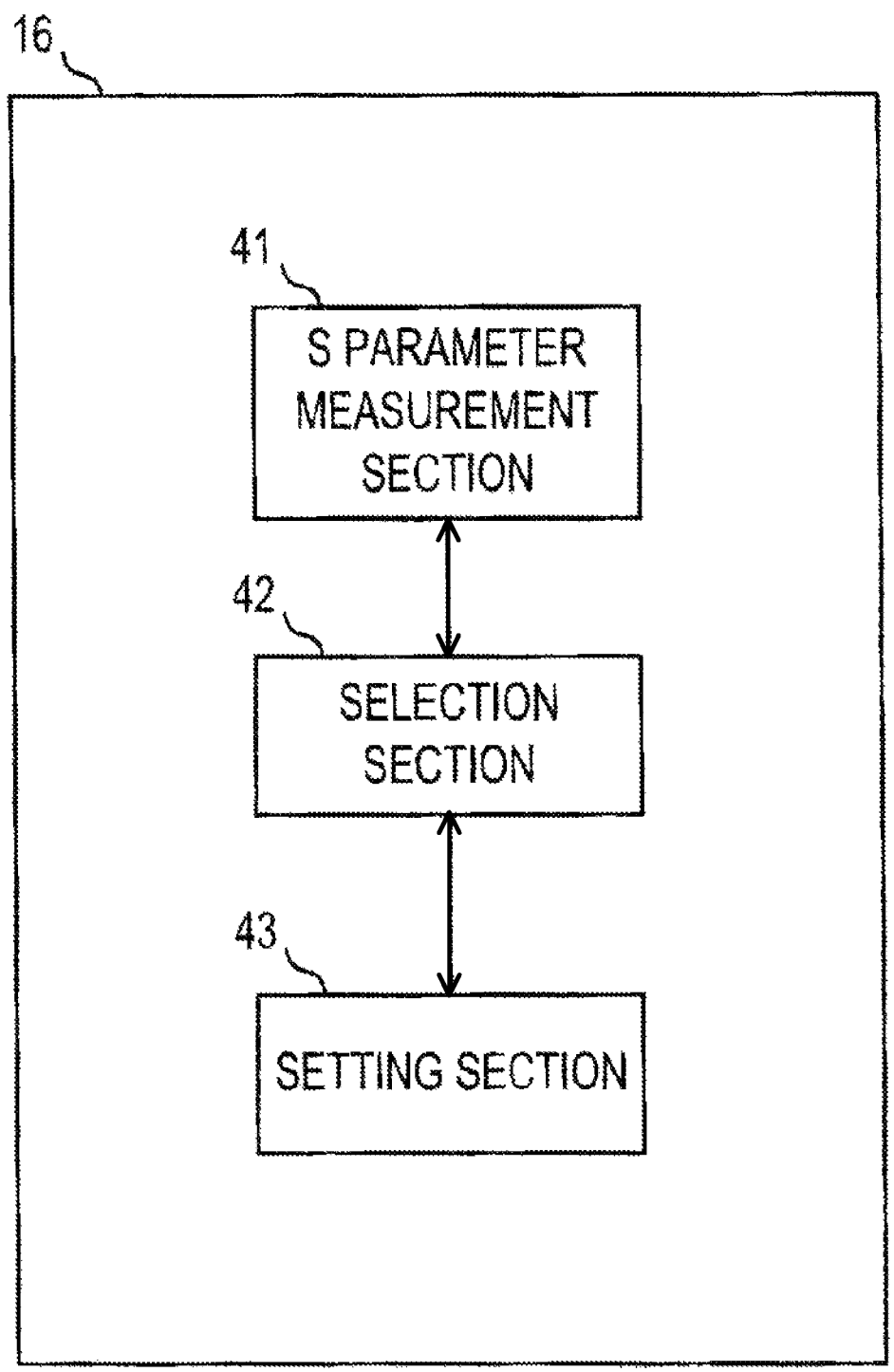
FIG. 2 is a block diagram showing an example of the configuration of software in a controller of an embodiment of the invention.

FIG. 2 is a block diagram showing an example of the configuration of software in the controller. The controller 16 executes an S parameter measurement section 41, a selection section 42 and a setting section 43, which are software. Here, the controller 16 can be, for example, a CPU, and the S parameter measurement section 41, the selection section 42 and the setting section 43 can be programs embodied as stored in memory 17, which can be executed by controller 16.

The transmission control section 21 can perform judgment of an open lane in the transmission LSI device 11 or control of the amplification section 23. The modulation section 22 can perform modulation of information to be transmitted by the transmission LSI device 11. The emphasis section 24 amplifies a predetermined frequency in order to prevent deterioration of a waveform caused by the transmission line. The amplification section 23 can amplify a signal to be transmitted.

The EQ 31 can equalize a waveform which has been deteriorated by the transmission line. The demodulation section 32 can demodulate a received signal. The waveform storage section 33 can store a received waveform. The BER measurement section 34 can measure the BER of the received signal. The eye opening measurement section 35 can measure the eye opening of the received signal. The judgment table storage section 36 stores a judgment table.

The judgment table storage section 36 stores the judgment table for determining an optimum frequency in the transmission LSI device 11 or the receiving LSI device 12.

The judgment section 37 can determine the optimum frequency on the basis of the judgment table.

The first network analyzer 28 can measure reflection characteristics such as reflection loss of the transmission line by transmitting a measurement signal (first signal) for measuring S parameters to the transmission line, and receiving the measurement signal reflected by the transmission line. The second network analyzer 38 can measure pass characteristics such as insertion loss of the transmission line, by receiving the measurement signal passing the transmission line.

A first signal transmission section and a second signal transmission section correspond to the transmission control section 21, the modulation section 22, the amplification section 23 and the emphasis section 24. A second signal receiving section corresponds to the EQ 31, the demodulation section 32, the waveform storage section 33, the BER measurement section 34 and the eye opening measurement section 35.

A determination section corresponds to the judgment table storage section 36, the judgment section 37, the controller 16 and the memory 17.

The S parameter measurement section 41 can instruct the first network analyzer 28 and the second network analyzer 38 to perform measurement and to calculate the S parameter characteristic of the transmission line on the basis of the measurement. The S parameter is a parameter indicating the frequency characteristic of the transmission line. The selection section 42 can select multiple values as an amplification section set value, which is a set value for the amplification section 23, an emphasis section set value, which is a set value for the emphasis section 24, and an EQ set value, which is a set value for the EQ 31, on the basis of the S parameter characteristic calculated by the S parameter measurement section 41.

Here, the amplification section set value indicates an amplification characteristic, which can be either the output amplitude value or the amplification factor of the amplification section 23. The emphasis section set value indicates an emphasis characteristic, and in this example it is gain in the frequency to be emphasized. The set value for the EQ 31 indicates an equalization characteristic, and it is the central frequency in this example. The EQ 31 has a frequency characteristic in which the gain becomes the maximum at the central frequency.

The signal transmission system of this embodiment may be a bidirectional interface having a common transmission line. In this example, the receiving LSI device 12 side is further provided with the modulation section 22, the amplification section 23, the emphasis section 24 and the first network analyzer 28 on, and the transmission LSI device 11 side is further provided with the EQ 31, the demodulation section 32, the waveform storage section 33, the BER measurement section 34, the eye opening measurement section 35, the judgment table storage section 36, the judgment section 37 and the second network analyzer 38. This signal transmission system performs transmission from the receiving LSI 12 side to the transmission LSI 11 side, similarly to transmission from the transmission LSI 11 side to the receiving LSI 12 side.

The operation of the signal transmission system according to this embodiment will be described below.

Figure 3:
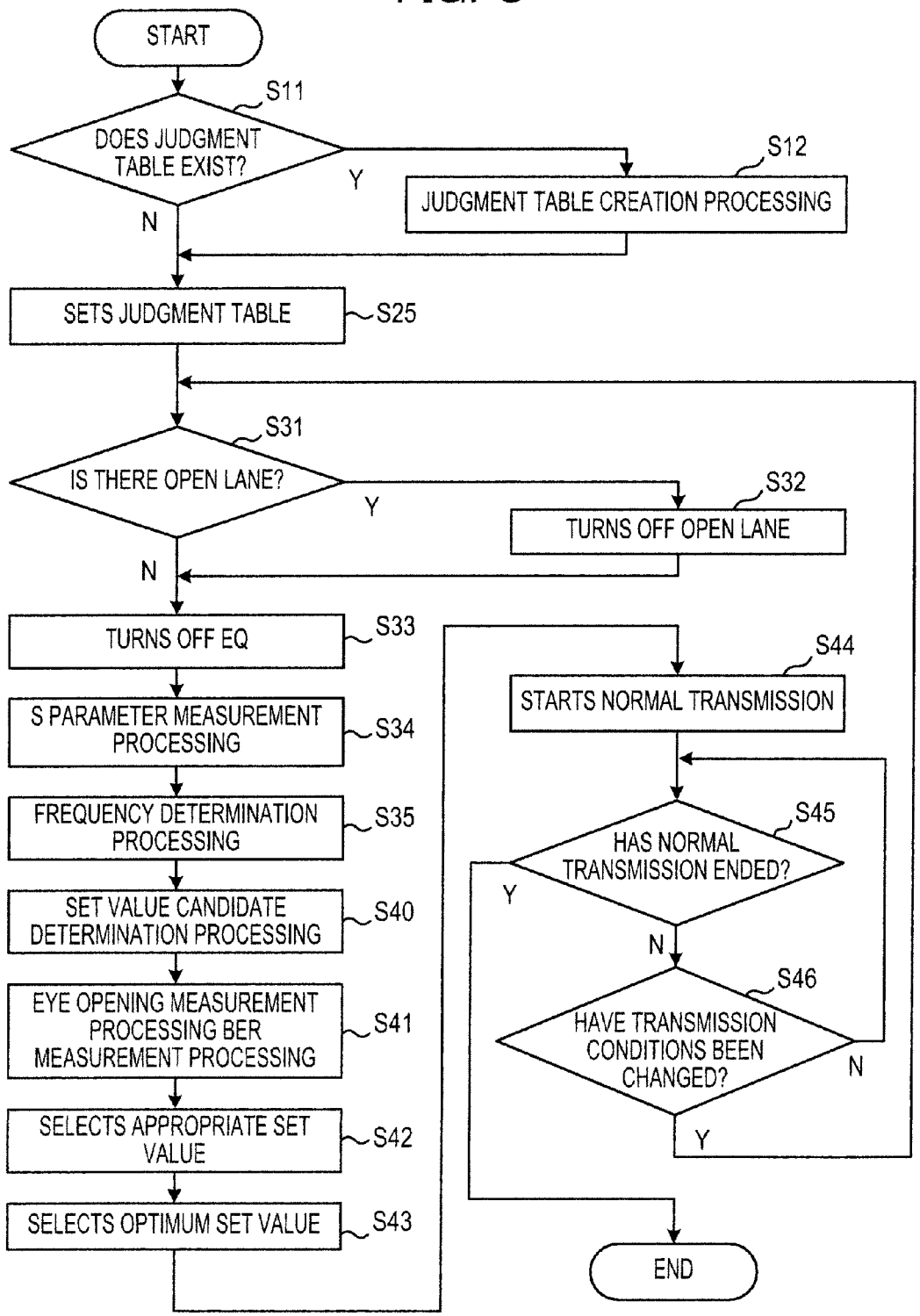
FIG. 3 is a flowchart showing an example of the operation of the signal transmission system of an embodiment of the invention.

FIG. 3 is a flowchart showing an example of the operation of the signal transmission system according to this embodiment.

At S11, the setting section 43 judges whether the judgment table exists in the memory or other appropriate location. If the judgment table exists (S11: Yes), the flowchart proceeds to processing S25. If the judgment table does not exist (S11: No), the setting section 43 performs judgment table creation processing for creating the judgment table (S12), and the flowchart proceeds to processing S25. In the judgment table creation processing, the setting section 43 acquires information, for example, inputted by users, about the data sheet (LSI standard) of the transmission LSI 11 and the receiving LSI 12 and creates the judgment table on the basis of this information.

The setting section 43 can acquire the created judgment table and sets it in the judgment table storage section 36 (S25).

The transmission control section 21 can judge whether there is an open lane or not (S31). If there is not an open lane (S31: No), the flowchart proceeds to processing S21. If there is an open lane (S31: Yes), the transmission control section 21 turns off the open lane or sets the output level to 0 for the amplification section 23 (S32), and the flowchart proceeds to processing S21. By judging an open lane which is unnecessary for transmission and stopping transmission/output, it is possible to suppress crosstalk due to open reflection and noise inside the LSI device, so that the BER can be advantageously reduced.

The S parameter measurement section 41 turns off the EQ 31 (S33), and performs S parameter measurement processing for measuring the S parameter by the first network analyzer 28 and the second network analyzer 38 (S34).

The judgment section 37 performs frequency determination processing for determining an optimum frequency on the basis of S parameter measurement values obtained by the S parameter measurement processing and the judgment table stored in the judgment table storage section 36 (S35).

The selection section 42 performs set value candidate determination processing for determining multiple set value candidates which are candidates for the set values for the amplification section 23, the emphasis section 24 and the EQ 31 (S40).

The selection section 42 sequentially sets combinations of set value candidates and performs eye opening measurement processing by the eye opening measurement section 35 and BER measurement processing by the BER measurement section 34 (S41).

The selection section 42 selects appropriate set values which are a combination of set value candidates satisfying predetermined appropriateness condition, on the basis of the eye opening and the BER obtained for each combination of set value candidates (S42).

An example of the appropriateness condition will be described. Under an appropriateness condition A, the selection section 42 can determine such set values that the BER is error free and the eye opening is the maximum, such set values that the BER is error free and the eye opening is the minimum, and such set values that the BER is error free and the eye opening is the closest to the central value, as the appropriate set values. Here, the central value is assumed to be an average value of the maximum value and the minimum value. Under an appropriate condition B, the selection section 42 can determine such set values that the BER is error free and the eye opening is within a range set in advance, as the appropriate set values. A user can select the appropriateness condition A or the appropriateness condition B as a predetermined appropriateness condition in advance.

The selection section 42 can select an optimum set value, which is a set value satisfying a predetermined optimum condition, from among the appropriate set values and sets the value for the amplification section 22, the emphasis section 24 and the EQ 31 (S43). Here, the optimum condition is that the eye opening is closest to the central value. Thereby, it is possible to suppress noise caused by excess of the eye opening and the amplitude and improve the receiving sensitivity.

The setting section 43 causes the transmission LSI device 11 and the receiving LSI device 12 to start normal transmission (S44). The setting section 43 can also judge whether or not transmission is to be ended (S45).

If transmission is to be ended (S45: Yes), the flowchart ends. If transmission is not to be ended (S45: No), the setting section 43 judges whether or not transmission conditions have been changed (S46). Here, the transmission conditions are, for example, transmission load, transmission distance and the like.

If the transmission conditions have not been changed (S46: No), the flowchart proceeds to processing S45. If the transmission conditions have been changed (S46: Yes), the flowchart proceeds to processing S31.

It is also possible to execute processing S41 to S42 for all the combinations of set value candidates and perform an operation with such set value candidates that the BER characteristic is in the best state.

The operation of the signal transmission system according to this embodiment does not necessarily require use of the complete process illustrated by flowchart described above, and it is also possible to configure a specific flowchart to perform a specific operation.

The frequency determination processing will be described below.

The judgment table has at least one judgment pattern. The judgment pattern can have the range of transmission clock frequency to be set and S parameter conditions to be satisfied by the S parameter measurement values. The S parameter conditions include an insertion loss condition and a reflection loss condition.

In the frequency determination processing, the judgment section 37 can acquire the frequency range of the judgment pattern within which the S parameter measurement values satisfy the S parameter conditions, and sets the highest frequency within the acquired frequency range as an optimum frequency.

Any frequency that satisfies the judgment pattern may be selected as the optimum frequency even if it is not the highest frequency. For example, it is possible to select such a frequency that reflection is the least among frequencies satisfying the judgment pattern, as the optimum frequency.

The details of the set value candidate determination processing will be described below.

In the set value candidate determination processing, the selection section 42 can determine three kinds of set values as each of the set value for the amplification section 23, the set value for the emphasis section 24 and the set value for the EQ 31.

Figure 4:
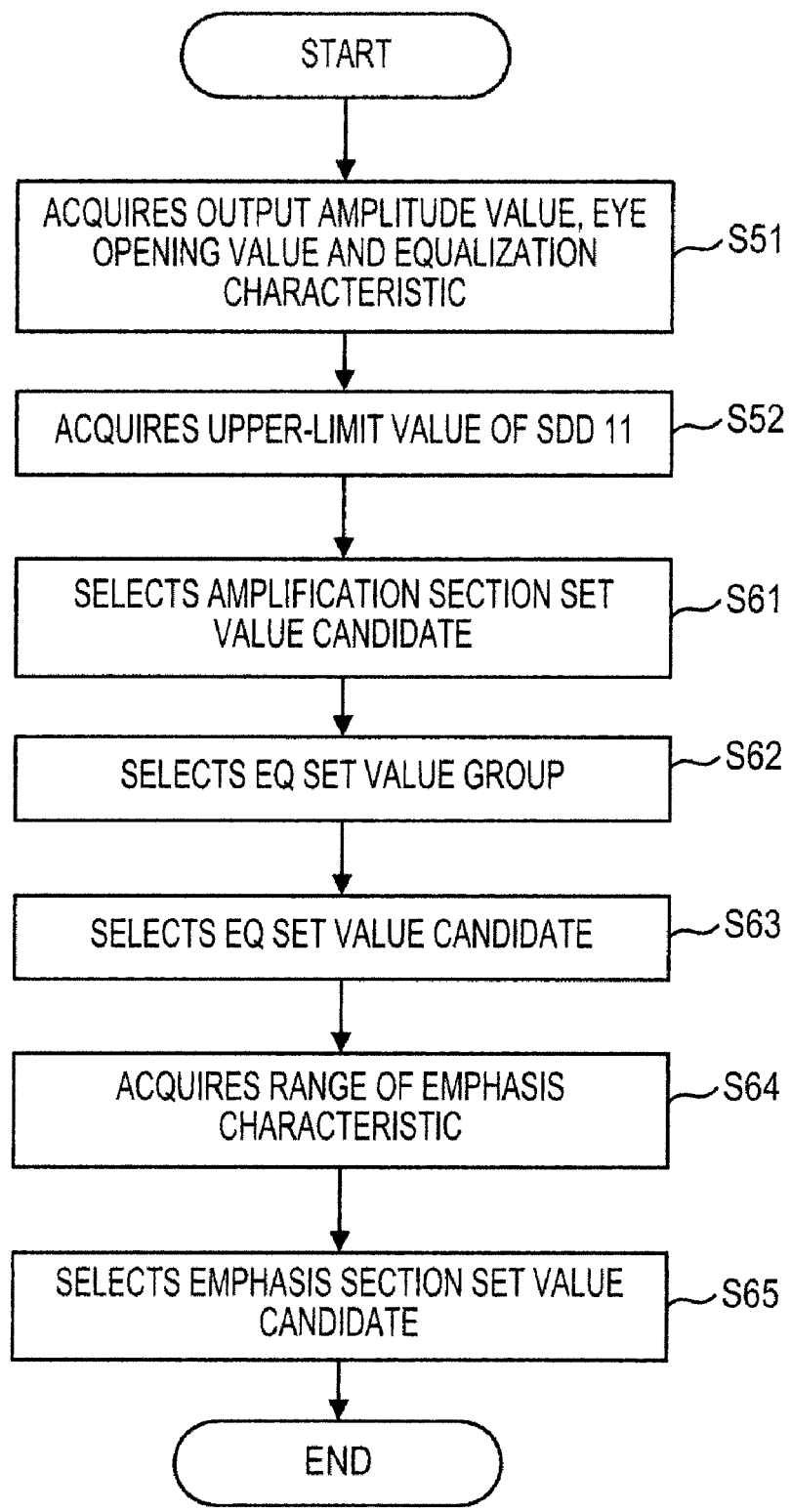
FIG. 4 is a flowchart showing an example of set value candidate determination processing of an embodiment of the invention.

FIG. 4 is a flowchart showing an example of the set value candidate determination processing according to this embodiment. As preprocessing, the selection section 42 can recognize the output amplitude value of each port of the transmission LSI device 11 and the eye opening value and the equalization characterization of each port of the receiving LSI device 12 and stores them into the memory 17 (S51). Here, the eye opening value is the value in the amplitude direction. Next, the selection section 42 can acquire an upper-limit value of SDD 11 (SDD11_1mt) which has little influence on transmission characteristics from an input performed in advance, and stores it into the memory 17 (S52).

The selection section 42 can select three kinds of output amplitude values which satisfy a predetermined setting condition from among all the output amplitude values, on the basis of the S parameter measurement values, the output amplitude value, and the eye opening value, and set them as amplification section set value candidates (S61). The predetermined selection condition is that an input amplitude value of the receiving LSI device 12 obtained from the output amplitude value in consideration of transmission loss based on a result of measurement of the S parameters satisfies a condition specified in advance.

The selection section 42 can select all such frequencies that the SDD 11 is equal to or below SDD11_1mt on the basis of the S parameter measurement result and sets them as an EQ set value group (S62). Next, the selection section 42 selects the central value of the EQ set value group, a value immediately above the central value and a value immediately below the central value as EQ set value candidates (S63). The selection section 42 acquires the range of gain in the emphasis characteristic from an input performed in advance (S64). Next, the selection section 42 sets the central value, the maximum value and the minimum value within the acquired range as emphasis section set value candidates (S65), and the flowchart ends.

By the operation of the signal transmission system described above, it is possible to perform stable transmission with a preferable waveform and preferable receiving sensitivity at an optimum frequency.

Furthermore, it is possible to perform stable transmission under optimum settings in all mass-produced apparatuses without being influenced by various variation factors. Thus, by using the signal transmission system according to this embodiment, it is possible to construct a high-capacity signal transmission system which easily realizes high reliability. Furthermore, by performing optimization again when changing the load or changing the transmission line, it is possible to construct a signal transmission system which is always stable.

A specific example of the operation of the signal transmission system according to this embodiment will be described below.

FIG. 5 is a table showing an example of the judgment table according to this embodiment. This judgment table is created on the basis of the data sheet of the transmission LSI device 11 and the receiving LSI device 12 and shows one judgment pattern. The judgment pattern has a judgment pattern number, a range of frequency, and an insertion loss (IL) condition and a reflection loss (RL) condition which are the S parameter conditions. The transmission clock frequency which can be used by the transmission LSI 11 and the receiving LSI 12 in this specific example is 1 GHz to 5 GHz (the transmission rate is 2 Gbps to 10 Gbps).

Figure 6:
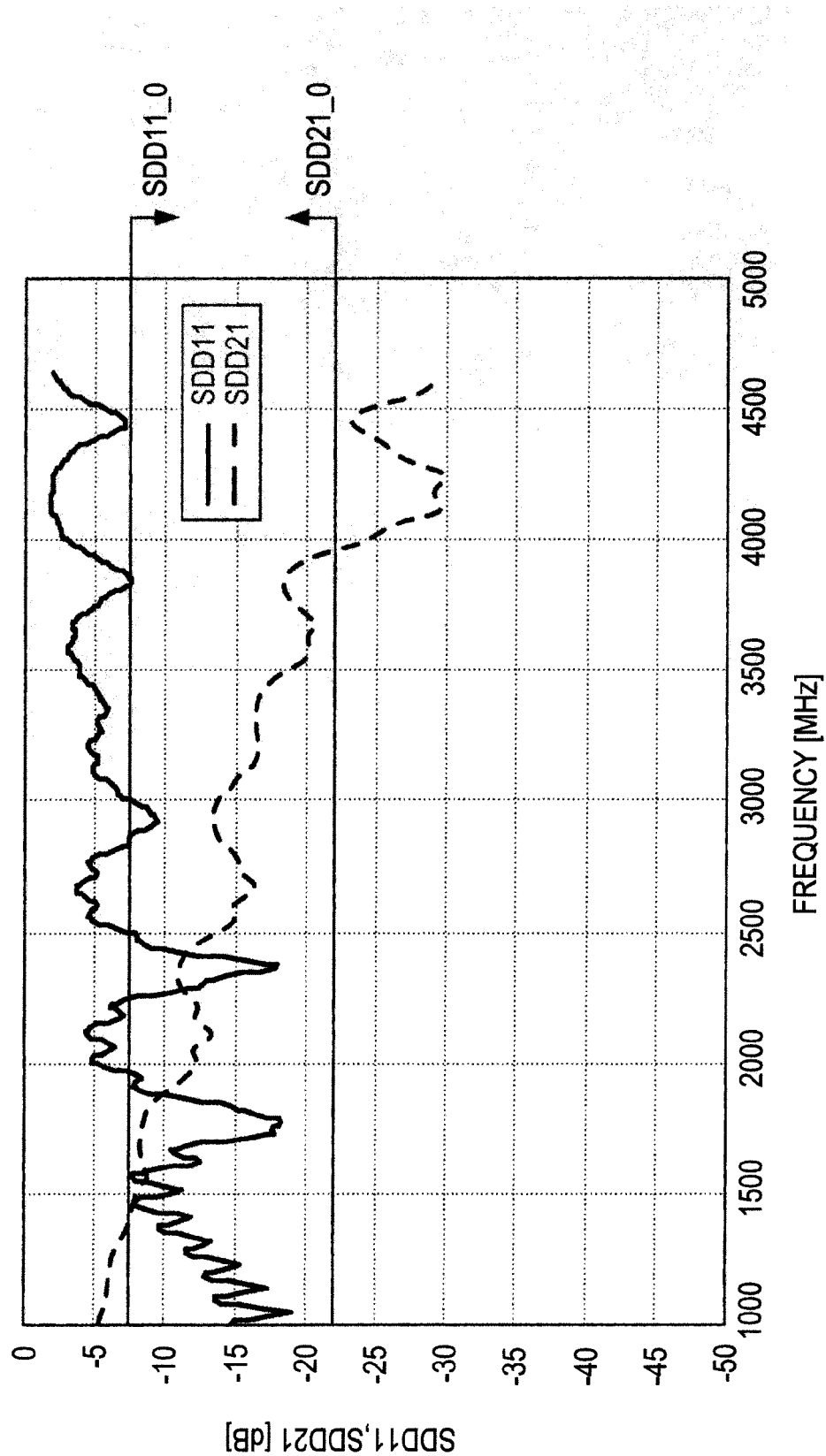
FIG. 6 is a graph showing an example of S parameter measurement values of an embodiment of the invention.

In the S parameter measurement processing, SDD 21 (insertion loss between differential motion and differential motion) and the SDD 11 (reflection loss between differential motion and differential motion) are measured and set as S parameter measurement values. FIG. 6 is a graph showing an example of the S parameter measurement values according to this embodiment. In this figure, the horizontal axis indicates frequency [MHz], and the vertical axis indicates the SDD 21 or the SDD 11 [dB]. The measurement values by a solid line indicate the SDD 11, and the measurement values by a broken line indicate the SDD 21.

SDD21_0 indicates the range of the SDD 21 which satisfies the insertion loss condition. SDD11_0 indicates the range of the SDD 11 which satisfies the reflection loss condition.

According to the judgment table and the S parameter characteristic described above, the highest frequency that satisfies the insertion loss condition and the reflection loss condition is 3.83 GHz (the transmission rate is 7.66 Gbps). Therefore, the optimum frequency is determined to be 3.83 GHz by optimum frequency determination processing.

FIG. 7 is a waveform diagram showing an example of the eye pattern of a received signal according to this embodiment. In this figure, the horizontal axis indicates time, and the vertical axis indicates received voltage [V]. Here, T denotes a transmission clock cycle (1/transmission clock frequency). In this example, T=1/3.83 [GHz]=262 [psec]. 1 UI (Unit Interval) is a 1-symbol time interval (transmission clock cycle/2). In this example, 1 UI=1/3.83 [GHz]/2=131 [psec]. E denotes the eye opening (in the voltage direction).

According to the various embodiments of the invention, it is possible to make the maximum use of the transmission line characteristics and the transmission/receiving LSI device characteristics and perform stable transmission with the maximum performance. In addition, since it is possible to easily and automatically make optimum transmission settings even when various variation factors occur, it is possible to always perform a stable operation even in a mass-produced apparatus. Furthermore, as a whole, the signal transmission system of the various embodiments makes it possible to improve the transmission quality, suppress transmission failures and considerably reduce man-hours for development, evaluation, examination and repair.

I claim:

1. A signal transmission apparatus comprising:
   a first signal transmission section configured to transmit a first signal for performing measurement of characteristics of a transmission line to the transmission line, the transmission line comprising multiple transmission signal lines;
   a reflection characteristic measurement section configured to measure a reflection characteristic of the transmission line based upon a reflected signal transmitted by the first signal transmission section and reflected by the transmission line;
   a pass characteristic measurement section configured to measure a pass characteristic of the transmission line based upon a passed signal that has been transmitted by the first signal transmission section and has passed the transmission line;
   a determination section configured to determine a transmission clock frequency based upon the reflection characteristic measured by the reflection characteristic measurement section and the pass characteristic measured by the pass characteristic measurement section;
   a second signal transmission section configured to modulate information using the transmission clock frequency determined by the determination section and to transmit a second signal obtained by modulation to the transmission line; and
   a signal receiving section configured to receive and to demodulate the second signal which has been transmitted by the second signal transmission section and has passed the transmission line.

2. The signal transmission apparatus according to claim 1, wherein
   the determination section is further configured to store at least one judgment pattern which is a combination of a transmission clock frequency condition, a reflection characteristic condition and a pass characteristic condition, and to determine the range of the transmission clock frequency which satisfies the judgment pattern.

3. The signal transmission apparatus according to claim 2, wherein
   the determination section is further configured to select the transmission clock frequency such that a transmission capacity is the highest within the determined transmission clock frequency range.

4. The signal transmission apparatus according to claim 1, wherein
   the second signal transmission section is further configured to detect an open lane among the multiple transmission line-signal lines and turns off output of the open lane.

5. The signal transmission apparatus according to claim 1, wherein
   the determination section is further configured to measure transmission quality in the transmission line to obtain a transmission quality measurement result, and to optimize an amplification characteristic used for transmission by the second signal transmission section, an emphasis characteristic used for transmission by the second signal transmission section, and an equalization characteristic used for receiving by the signal receiving section based upon the transmission quality measurement result.

6. The signal transmission apparatus according to claim 5, wherein
   the determination section is further configured to measure the transmission quality including eye opening and to acquire multiple combinations of a set value of the amplification characteristic, a set value of the emphasis characteristic and a set value of the equalization characteristic, and to measure the transmission quality for each of the multiple combinations, to select a combination such that the eye opening is a central value, to set the selected combination for the second signal transmission section and the signal receiving section, and to perform transmission of the information.

7. The signal transmission apparatus according to claim 5, wherein
   the determination section is further configured to perform the measurement of the transmission quality and the optimization before the transmission of the information.

8. The signal transmission apparatus according to claim 5, wherein
   the determination section is further configured to perform the measurement of the transmission quality and the optimization when a transmission load of the transmission line changes.

9. The signal transmission apparatus according to claim 1, wherein
   the determination section is further configured to measure transmission quality including eye opening and to acquire multiple combinations of a set value of an amplification characteristic, a set value of an emphasis characteristic and a set value of an equalization characteristic, and to measure the transmission quality for each of the multiple combinations, to select a combination such that an error rate satisfies a predetermined error rate condition and the eye opening is a central value, to set the selected combination for the second signal transmission section and the signal receiving section, and to perform transmission of the information.

10. The signal transmission apparatus according to claim 1, wherein
    the determination section is further configured to measure transmission quality including an error rate, and to acquire multiple combinations of a set value of an amplification characteristic, a set value of an emphasis characteristic and a set value of an equalization characteristic, and to measure the transmission quality for each of the multiple combinations, to select a combination such that the error rate is a minimum error rate, to set the selected combination for the second signal transmission section and the signal receiving section, and to perform transmission of the information.

11. The signal transmission apparatus according to claim 1, wherein
    the reflection characteristic measurement section is further configured to measure the reflection characteristic which is a frequency characteristic of reflection loss among parameters; and
    the pass characteristic measurement section is configured to measure the pass characteristic which is a frequency characteristic of insertion loss among the parameters.

12. A signal transmission method, the method comprising:
    transmitting a first signal performing measurement of characteristics of a transmission line to the transmission line, the transmission line comprising multiple transmission signal lines;
    measuring a reflection characteristic of the transmission line based upon a reflected signal reflected by the transmission line;
    measuring a pass characteristic of the transmission line based upon a passed signal that has passed the transmission line;

determining a transmission clock frequency based upon the measured reflection characteristic and the measured pass characteristic;

modulating information using the determined transmission clock frequency;

transmitting a second signal obtained by the modulation to the transmission line; and receiving and demodulating the second signal which has been transmitted and has passed the transmission line.

13. The signal transmission method according to claim 12, further comprising:

storing at least one judgment pattern comprising a combination of a transmission clock frequency condition, a reflection characteristic condition and a pass characteristic condition; and determining the range of the transmission clock frequency which satisfies the judgment pattern.

14. The signal transmission method according to claim 13, further comprising:

selecting the transmission clock frequency such that a transmission capacity is the highest within the determined transmission clock frequency range.

15. The signal transmission method according to claim 12, further comprising:

detecting an open lane among the multiple transmission signal lines and turning off the open lane.

16. The signal transmission method according to claim 12, further comprising:

measuring transmission quality in the transmission line to obtain a transmission quality measurement result; and optimizing an amplification characteristic used for transmission of the second signal, an emphasis characteristic used for transmission of the second signal, and an equalization characteristic used for receiving of the second signal based upon the transmission quality measurement result.

17. The signal transmission method according to claim 16, further comprising:

acquiring multiple combinations of a set value of the amplification characteristic, a set value of the emphasis characteristic and a set value of the equalization characteristic;

measuring the transmission quality including eye opening for each of the multiple combinations, selecting and setting a combination such that the eye opening is a central value; and performing transmission of the information.

18. The signal transmission method according to claim 16, further comprising:

acquiring multiple combinations of a set value of the amplification characteristic, a set value of the emphasis characteristic and a set value of the equalization characteristic;

measuring the transmission quality including an error rate and eye opening for each of the multiple combinations;

selecting and setting a combination such that the error rate satisfies a predetermined error rate condition and the eye opening is a central value; and performing transmission of the information.

19. The signal transmission method according to claim 16, further comprising:

performing the measurement of the transmission quality and the optimization before the transmission of the information.

20. The signal transmission method according to claim 16, further comprising:

performing the measurement of the transmission quality and the optimization when a transmission load of the transmission line changes.

21. A signal transmission apparatus, comprising:

transmitting means for transmitting a first signal performing measurement of characteristics of a transmission line to the transmission line, the transmission line comprising multiple transmission signal lines;

measuring means for measuring a reflection characteristic of the transmission line based upon a reflected signal reflected by the transmission line, and for measuring a pass characteristic of the transmission line based upon a passed signal that has passed the transmission line;

determining means for determining a transmission clock frequency based upon the measured reflection characteristic and the measured pass characteristic;

modulating means for modulating information using the determined transmission clock frequency, and transmitting a second signal obtained by the modulation to the transmission line; and demodulating means for receiving and demodulating the second signal which has been transmitted and has passed the transmission line.

* * * * *